United States Patent [19]

Achleitner

[11] Patent Number: 5,673,555
[45] Date of Patent: Oct. 7, 1997

[54] METHOD FOR CHECKING THE EFFICIENCY OF A CATALYTIC CONVERTER

[75] Inventor: Erwin Achleitner, Regensburg, Germany

[73] Assignee: Siemens Aktiengesellschaft, Munich, Germany

[21] Appl. No.: 562,803

[22] Filed: Nov. 27, 1995

Related U.S. Application Data

[63] Continuation of PCT/EP94/01697, May 25, 1994, published as WO93/02280, Feb. 4, 1993.

[30] Foreign Application Priority Data

May 27, 1993 [EP] European Pat. Off. ............ 93 108 615

[51] Int. Cl.$^6$ .................................................. F01N 3/20
[52] U.S. Cl. .............................. 60/274; 60/276; 60/277
[58] Field of Search ............................ 60/276, 277, 274

[56] References Cited

U.S. PATENT DOCUMENTS 5,134,847  8/1992  Ogawa et al. .
5,289,678  3/1994  Grutter ............................. 60/277
5,377,558  1/1995  Komatsu ........................... 60/277

FOREIGN PATENT DOCUMENTS 0536789   4/1993  European Pat. Off. .
93/02280  2/1993  WIPO .
93/09335  5/1993  WIPO .

*Primary Examiner*—Douglas Hart
*Attorney, Agent, or Firm*—Herbert L. Lerner; Laurence A. Greenberg

[57] ABSTRACT

A method is provided for checking the efficiency of a catalytic converter with an oxygen probe upstream of the catalytic converter and of an oxygen probe downstream of the catalytic converter. A ratio of times in which the oxygen probe downstream of the catalytic converter and the oxygen probe upstream of the catalytic converter indicate a rich or a lean mixture value is formed. The catalytic converter has a sufficient efficiency if the value of the smaller amount of the ratio values is lower than a predeterminable limit value.

5 Claims, 1 Drawing Sheet

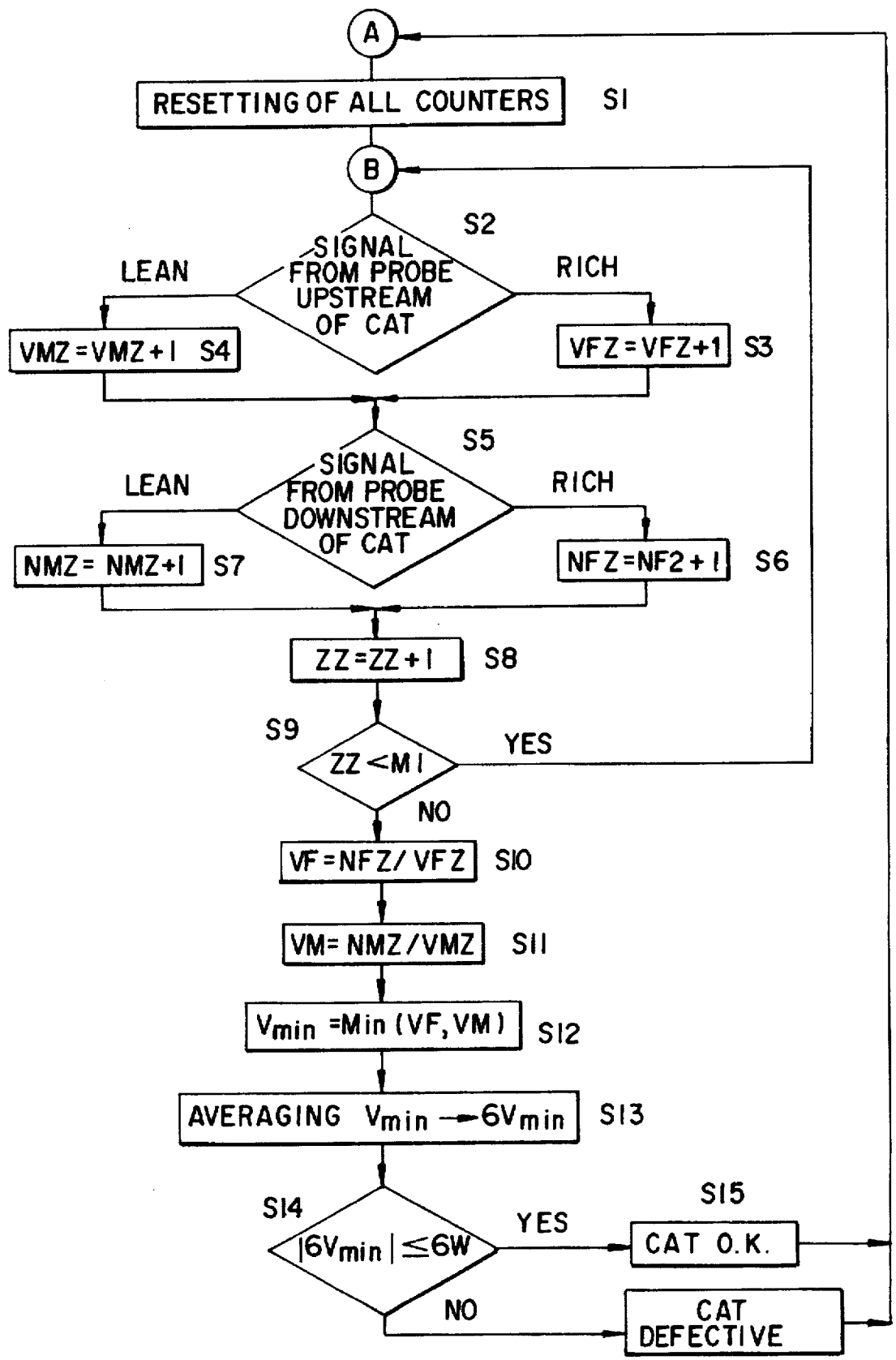

METHOD FOR CHECKING THE EFFICIENCY OF A CATALYTIC CONVERTER

CROSS REFERENCE TO RELATED APPLICATION

This application is a continuation of International Application PCT/EP94/01697, filed May 25, 1994.

BACKGROUND OF THE INVENTION

Field of the Invention

The invention relates to a method for checking the efficiency of a catalytic converter in an exhaust-gas tract of an internal combustion engine through the use of an oxygen probe upstream of the catalytic converter and an oxygen probe downstream of the catalytic converter.

In internal combustion engines, emissions of harmful substances can be reduced by catalytic aftertreatment. Catalytic aftertreatment presupposes a specific composition of the exhaust gas, namely a so-called stoichiometric mixture. That purpose is served by a regulation of the mixture with a so-called lambda probe, through the use of which the mixture composition is regulated periodically within narrow limits around the desired value. To that effect, the probe emits a high voltage (the rich voltage) in the case of a rich fuel/air mixture and a low voltage (the lean voltage) in the case of a lean fuel/air mixture. Located between those voltages is a voltage jump which is characteristic of $\lambda=1$.

The catalytic converters can become defective during operation, for example as a result of the occurrence of misfires or by the mistaken use of lead-containing fuel. When the catalytic converter is defective, the exhaust gases are no longer decontaminated at all or are only partially decontaminated.

It is therefore necessary to monitor the functional capacity of the catalytic converter. There are various known methods which use an oxygen probe upstream of the catalytic converter and an oxygen probe downstream of the catalytic converter to check the catalytic converter. For example, German Patent Applications DE 23 04 622, DE 38 30 515 and DE 23 28 459 describe methods which evaluate a difference between output signals from the two oxygen probes. German Patent Applications DE 24 44 334, DE 38 41 685 and DE 41 01 616 employ the time delay between the two probes for the changeover from rich to lean or vice versa as a measure of the efficiency of the catalytic converter. European Patent Applications 0 466 311 and 0 478 133 specify checking methods in which the mixture composition is varied artificially and the signal trends of the two probes are then compared with one another.

SUMMARY OF THE INVENTION

It is accordingly an object of the invention to provide a method for checking the efficiency of a catalytic converter, which overcomes the hereinafore-mentioned disadvantages of the heretofore-known methods of this general type and which makes it possible to reliably check a functional capacity or an efficiency of the catalytic converter.

With the foregoing and other objects in view there is provided, in accordance with the invention, a method for checking the efficiency of a catalytic converter having an oxygen probe upstream and an oxygen probe downstream of the catalytic converter, which comprises forming a ratio of times during which an oxygen probe downstream of a catalytic converter and an oxygen probe upstream of the catalytic converter indicate a rich mixture during a test period; forming a ratio of times during which the oxygen probe downstream of the catalytic converter and the oxygen probe upstream of the catalytic converter indicate a lean mixture during a test period; and indicating that an efficiency of the catalytic converter is sufficient if the smaller value of the two ratios is lower than a predeterminable limit value.

In accordance with another mode of the invention, there is provided a method which comprises conducting the catalytic converter efficiency check only when the internal combustion engine is in an approximately steady-state operating state.

In accordance with a further mode of the invention, there is provided a method which comprises averaging the smaller value of the ratios of the lean and rich times before a comparison with the limit value.

In accordance with an added mode of the invention, there is provided a method which comprises supplying a result of the catalytic converter efficiency check for statistical evaluation.

In accordance with a concomitant mode of the invention, there is provided a method which comprises setting the limit value of the ratio times in dependence on a load and a speed of the internal combustion engine.

Two lambda probes are used for this purpose, namely one upstream of the catalytic converter and one downstream of the catalytic converter. The magnitude of the oxygen storage capacity of the catalytic converter is used as a measure of its efficiency. If the catalytic converter has a high efficiency, the lambda fluctuations upstream of the catalytic converter, which are generated by the lambda controller, are smoothed out through the use of the oxygen storage capacity of the catalytic converter.

If the catalytic converter still only has a low efficiency, that is to say a low oxygen storage capacity, as a result of aging, contamination by leaded fuel or because of combustion misfires, the lambda fluctuations upstream of the catalytic converter also become visible downstream of the catalytic converter. The lambda fluctuations-downstream of the catalytic converter are measured through the use of a lambda probe which measures the oxygen content in the exhaust gas.

In the method according to the invention, for a specific test period, the times during which the lambda probe upstream of the catalytic converter indicates a rich value (rich times upstream of CAT) and the times during which the lambda probe upstream of the catalytic converter indicates a lean value (lean times upstream of CAT) are determined.

The same is carried out for the lambda probe downstream of the CAT (rich times or lean times downstream of CAT).

The ratios: rich times downstream of CAT/rich times upstream of CAT and lean times downstream of CAT/lean times upstream of CAT are then formed.

If at least one of these ratio raises is approximately zero, then the signal has been smoothed out sufficiently, that is to say the catalytic converter has a sufficiently high efficiency.

The lower value of the two ratio values is being formed and subsequently subjected to statistical evaluation, since the measurement cycles have a high dispersion, for example it can happen that, despite the presence of a defective catalytic converter, an individual measurement cycle can incorrectly imply an intact catalytic converter. As a result of the statistical evaluation, it is further possible to detect the residual efficiency at which the catalytic converter is still working.

Other features which are considered as characteristic for the invention are set forth in the appended claims.

Although the invention is illustrated and described herein as embodied in a method for checking the efficiency of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing FIGURE is a flow chart showing the method according to the invention.

DESCRIPTION OF THE PREFERRED EMBODIMENTS

Referring now to the single FIGURE of the drawing in detail, it is seen that a check can take place only when an internal combustion engine is in an approximately steady-state operating state. A cooling-water temperature must be above a minimum threshold, a catalytic converter must be at an operating temperature and a lambda regulation must be active. At a start A of a test period, all counters are set to zero in a method step S1. An interrogation of probe signals from the lambda probes upstream and downstream of the catalytic converter takes place cyclically, for example at a rate derived from a processing computer.

In a method step S2, a check is made as to whether the signal from the probe upstream of the catalytic converter indicates a lean or a rich mixture. If the mixture is rich, a branch-off to a method step S3 takes place and a time counter for "rich times" of the probe upstream of the catalytic converter (VFZ) is increased by one. If the mixture is lean, a branch-off to a method step S4 takes place and a time counter for "lean times" of the probe upstream of the catalytic converter (VMZ) is increased by one.

In both cases, the method proceeds to a method step S5, in which the signal from the probe downstream of the catalytic converter is checked. If the probe indicates a rich mixture, a branch-off to a method step S6 takes place and a "rich-time counter" for the probe downstream of the catalytic converter (NFZ) is increased by one. However, if the probe indicates a lean mixture a branch-off to a method step S7 takes place and a "lean-time counter" for the probe downstream of the catalytic converter (NMZ) is increased by one.

In both cases, the method proceeds to a method step S8, in which a time counter ZZ for the test period is increased by one. In a method step S9, a check is made as to whether or not the test period has already elapsed. If not, there is a return to a point B and the probe signals are evaluated once again.

In contrast, if the test period has elapsed, the measured times are evaluated. In a method step S10, a ratio VF of the duration of the rich times measured at the lambda probe upstream of the catalytic converter, to the duration of the rich times measured by the probe downstream of the catalytic converter, is indicated. In a method step S11, the same takes place for the duration of the lean times which have been measured upstream and downstream of the catalytic converter (VM).

In a method step S12, a minimum ($V_{min}$) is calculated from the two ratios. In a method step S13, this minimum is subjected to averaging ($GV_{min}$), for example a sliding averaging.

If the amount of the value $GV_{min}$ which is thus determined is lower than or equal to a predeterminable limit value GW, a branch-off from a method step S14 to a method step S15 takes place and it is communicated, for example to a non-illustrated statistical evaluation circuit, that the catalytic converter has a sufficiently high efficiency (CAT o.k.).

However, if the limit value is exceeded a branch-off from the method step S14 to the method step S15 takes place and there is a communication, if appropriate by the intermediary of a statistical evaluation circuit, that the catalytic converter no longer has a sufficient efficiency (CAT defective).

A return is subsequently made again to the beginning of the method at the start A and, if the requisite boundary conditions are present, a new check is started.

I claim:

1. A method for checking the efficiency of a catalytic converter having an oxygen probe upstream and an oxygen probe downstream of the catalytic converter, which comprises:

forming a ratio of times during which an oxygen probe downstream of a catalytic converter and an oxygen probe upstream of the catalytic converter indicate a rich mixture during a test period;

forming a ratio of times during which the oxygen probe downstream of the catalytic converter and the oxygen probe upstream of the catalytic converter indicate a lean mixture during a test period; and indicating that an efficiency of the catalytic converter is sufficient if the smaller value of the two ratios is lower than a predeterminable limit value.

2. The method according to claim 1, which comprises conducting the catalytic converter efficiency check only when the internal combustion engine is in an approximately steady-state operating state.

3. The method according to claim 1, which comprises averaging the smaller value of the ratios of the lean and rich times before a comparison with the limit value.

4. The method according to claim 1, which comprises supplying a result of the catalytic converter efficiency check for statistical evaluation.

5. The method according to claim 1, which comprises setting the limit value of the ratio times in dependence on a load and a speed of the internal combustion engine.

* * * * *